US011940563B2

(12) United States Patent
Huber et al.

(10) Patent No.: US 11,940,563 B2
(45) Date of Patent: Mar. 26, 2024

(54) SENSOR AND METHOD FOR MANUFACTURING AN INDUCTIVE ENERGY TRANSMISSION UNIT

(71) Applicant: SICK AG, Waldkirch (DE)

(72) Inventors: Gregor Huber, Waldkirch (DE); August Baumgartner, Waldkirch (DE)

(73) Assignee: SICK AG, Waldkirch (DE)

( * ) Notice: Subject to any disclaimer, the term of this patent is extended or adjusted under 35 U.S.C. 154(b) by 811 days.

(21) Appl. No.: 17/075,521

(22) Filed: Oct. 20, 2020

(65) Prior Publication Data

US 2021/0124022 A1 Apr. 29, 2021

(30) Foreign Application Priority Data

Oct. 25, 2019 (DE) .......................... 102019128928.9

(51) Int. Cl.
G01S 7/481 (2006.01)
H01F 38/14 (2006.01)

(52) U.S. Cl.
CPC ............ *G01S 7/4817* (2013.01); *H01F 38/14* (2013.01); *H01F 2038/143* (2013.01)

(58) Field of Classification Search
CPC ...... G01S 7/4817; G01S 7/4812; G01S 17/42; H01F 2038/143; H01F 38/14; H01F 3/14; H01F 38/18; H01F 27/263
USPC ....................................... 356/4.01
See application file for complete search history.

(56) References Cited

FOREIGN PATENT DOCUMENTS

| CN | 206117320 U | 4/2017 |
| DE | 19757849 B4 | 12/2004 |
| DE | 102004028595 A1 | 12/2005 |
| EP | 2388619 A1 | 11/2011 |
| EP | 2688078 A1 | 1/2014 |
| EP | 1975571 B1 | 6/2016 |
| EP | 2933655 B1 | 6/2016 |
| EP | 2875512 B1 | 9/2016 |
| EP | 3070723 A2 | 9/2016 |
| JP | 2017204554 A | 11/2017 |
| WO | 2012/166134 A1 | 12/2012 |

*Primary Examiner* — Daniel L Murphy
(74) *Attorney, Agent, or Firm* — Nath, Goldberg & Meyer; Jerald L. Meyer

(57) ABSTRACT

A sensor is provided comprising at least one transmitter for transmitting a transmission signal; at least one receiver for generating a received signal from the transmitted signal reflected back by the objects; a base unit; a scanning unit movable about an axis of rotation with respect to the base unit for a periodic scanning of the monitored zone; and a control and evaluation unit for detecting information on the objects with reference to the received signal, wherein an inductive energy transmission unit is provided between the base unit and the scanning unit that comprises a first guide element of the base unit and a second guide element of the scanning unit for guiding the magnetic field of the inductive energy transmission; and wherein the guide elements have an L-shaped cross-section. In this respect, the guide elements are divided into at least two respective guide segments in the peripheral direction.

15 Claims, 2 Drawing Sheets

SENSOR AND METHOD FOR MANUFACTURING AN INDUCTIVE ENERGY TRANSMISSION UNIT

Figure 1:
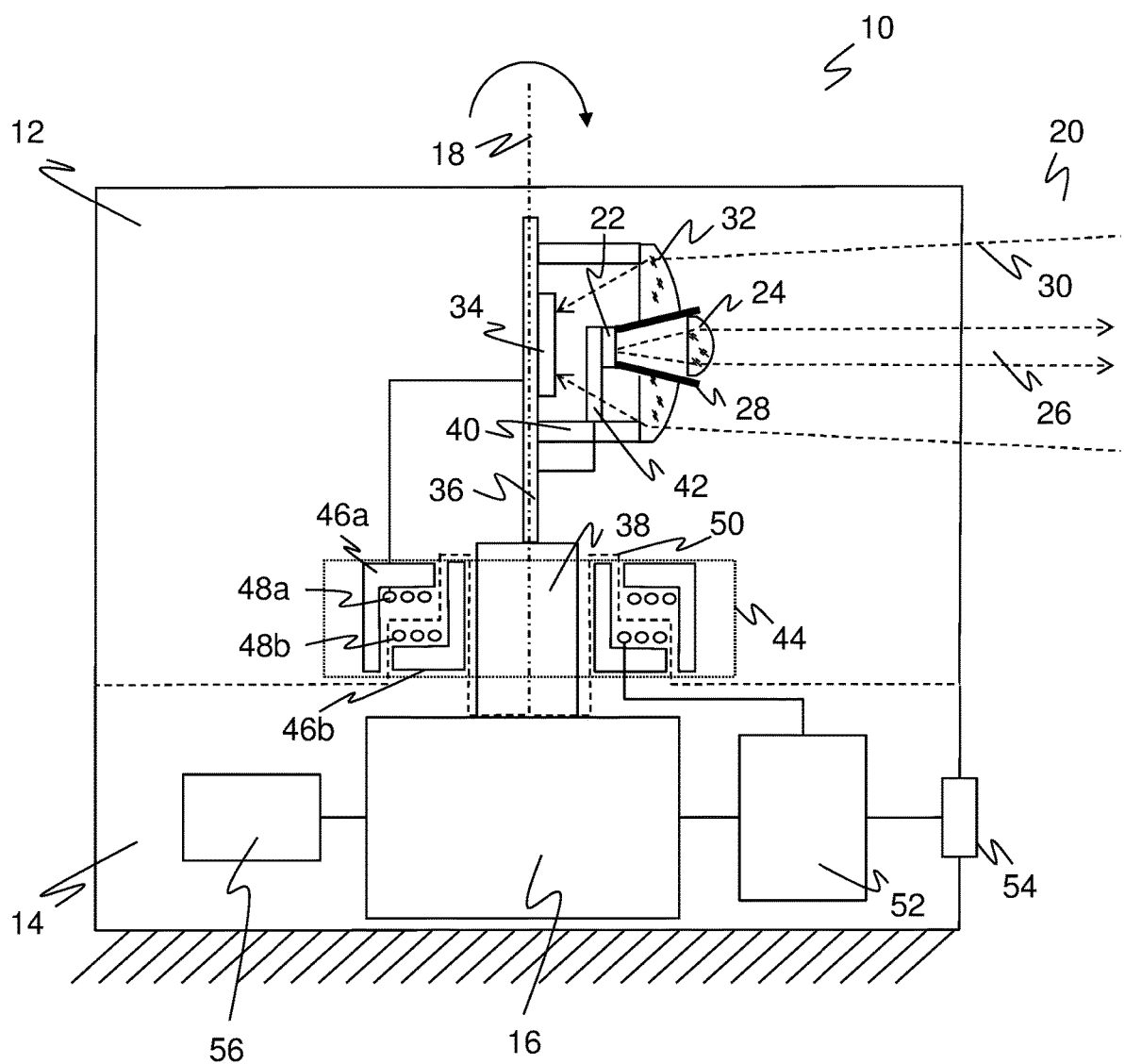

The invention relates to a sensor, in particular to a laser scanner or to a radar, especially designed for detecting objects in a monitored zone, having a base unit and a scanning unit movable about an axis of rotation with respect to the base unit, and to a method of manufacturing an inductive energy transmission unit for a sensor.

In a laser scanner, a light beam generated by a laser periodically sweeps over a monitored zone with the help of a deflection unit. The light is remitted at objects in the monitored zone and is evaluated in the scanner. A conclusion is drawn on the angular location of the object from the angular position of the deflection unit and additionally on the distance of the object from the laser scanner from the time of flight while using the speed of light. The location of an object in the monitored zone is detected in two-dimensional polar coordinates using the angular data and the distance data. The positions of objects can thus be determined or the contour of an object can be determined by a plurality of scans of said same object at different positions. The third spatial coordinate can likewise be detected by a relative movement in the transverse direction, for example by a further degree of freedom of movement of the deflection unit in the laser scanner or in that the object is conveyed relative to the laser scanner. Three-dimensional contours can thus also be measured.

The scanning of the monitored plane in a laser scanner is typically achieved in that the transmitted beam is incident onto a rotating mirror. The light transmitters, light receivers and associated electronics and optics are fixedly installed in the device and do not also execute the rotary movement. It is also known to replace the rotating mirror with a scanning unit which is also moved. For example in DE 197 57 849 B4, the total measurement head with the light transmitter and light receiver rotates. A radar works in a similar basic setup, with the transmitters and receivers using a completely different frequency range.

The rotating electronic components have to be supplied with energy. To avoid mechanical wear here, for instance of a sliding contact, a wireless supply is aimed for. Inductive energy transmission is known for this. One respective coil is accommodated in the stationary part and in the movable part of the sensor. They are surrounded by ferrites in the manner of a shell to concentrate the magnetic field and thus to amplify the inductive coupling of the coils. The ferrites also act as a screen and prevent scatter fields from generating eddy currents and thus losses in the surrounding metallic components.

The two coils together with the surrounding ferrites rotate with respect to one another and there is an air gap between them. This air gap should be as small as possible to achieve a high transmission efficiency. Different orientations of the air gap are distinguished in this process. In an orientation of the air gap in parallel with the axis of rotation, the ferrites forms two concentric rings of different diameters disposed in one another. The coil winding for the outer ring is complex and expensive. In addition, the eccentricities of the ferrites have to be extremely small since they could otherwise touch one another with a small air gap. In an orientation of the air gap in perpendicular to the axis of rotation, the ferrites forms two rings of the same diameter disposed on one another. This arrangement is sensitive to vibration load and shock load with a risk of bottoming out. An adjustment process is required to set an exact gap spacing.

The tolerance demands for the air gap are accordingly high. Sintered ferrites, however, have large production tolerances of 2-5%, with the shrinkage tolerances being proportional to the ferrite size. The ferrites are conventionally produced rotationally symmetrically from one piece and are relatively large. The ferrites therefore as a rule have to be reworked for small gap dimensions. This is very expensive and complex due to the brittle material properties. The brittle material properties of the ferrites additionally come with the risk of failure due to breakage on the basis of environmental influences such as vibration load and shock load as the component size increases.

EP 2 388 619 A1 discloses a laser scanner having a contactless data and energy transmission to its rotating measuring head. The energy transmission can take place inductively and a ferromagnetic core is mentioned without this then being expounded in any more detail.

A laser scanner is known from EP 2 933 655 B1 in which components for an inductive energy supply and a capacitive data transmission are accommodated on two circuit boards of a fixed position base unit or a movable scanning unit said circuit boards rotating with respect to one another. The circuit boards are surrounded by a ferrite jacket that consists of two parts each having an L-shaped cross-section. The L shapes are mirrored toward one another at a horizontal axis and stand on one another at the inside with the shaft having the short limb at a spacing of the air gap so that they form a radially outwardly open U shape together. This corresponds to the above-discussed concept of the parallel air gap.

EP 1 975 571 B1 discloses a further laser scanner having contactless data and energy transmission. The energy transmitting and energy receiving units each have an L-shaped cross-section, with coils being arranged at the long limb of the L shape and with the L shapes being arranged with respect to one another such that the respective long and short limbs are disposed opposite one another. An arrangement with both a perpendicular and a parallel air gap is proposed by a corresponding rotation of the L shape. It is not, however, discussed how the energy transmitting and energy receiving units could be manufactured with the required tolerances.

A contactless energy and data transmission for other kinds of sensors having a rotating part such as pressure sensors, strain gauges, temperature sensors, or vibration sensors is presented in EP 2 875 512 B1. L-shaped magnetic cores are used for the energy transmission in which in turn the long and short limbs of the L shape are opposite one another without looking at the problem of setting the air gap and the production tolerances.

It is therefore the object of the invention to simplify the design of a sensor having a co-moved scanning unit.

This object is satisfied by a sensor for detecting objects in a monitored zone and by a method for manufacturing an inductive energy transmission unit for a sensor in accordance with the respective independent claim. The sensor has a transmitter and a receiver to transmit a transmitted signal into the monitored zone and to generate and evaluate a corresponding received signal from the transmitted signal reflected at the objects. The sensor is designed in two parts with a base unit and a scanning unit that is movable about an axis of rotation with respect to the former and that periodically scans the monitored zone in the course of the movement. To supply the components co-moved in the scanning unit, an energy transmission unit is provided for the wireless energy transmission by means of electromagnetic induction. The energy transmission unit comprises a first guide element that is stationary with the base unit and a second guide element that moves with the scanning unit. The guide elements have the function of amplifying and guiding the magnetic field. They each have an L-shaped cross-section.

The invention starts from the basic idea of manufacturing the guide elements from a plurality of parts. They are divided in the peripheral direction with respect to the axis of rotation into at least two guide segments. It is therefore not, as conventionally, a case of comparatively large, rotationally symmetrical components produced from one piece.

The invention first has the advantages of a contactless energy supply that is free of wear. The design from a plurality of guide segments makes particularly small mechanical tolerances possible at the air gap and thus a high efficiency of the energy transmission. This is achieved without reworking or at least with substantially less reworking so that the manufacturing costs are considerably reduced with the same or even with a higher functional quality. At the same time, the energy transmission unit has high mechanical robustness.

The sensor is preferably an optoelectronic sensor, in particular a laser scanner. The transmitter and receiver are then a light transmitter and a light receiver respectively. Alternatively, the sensor is a radar where then a radar transmitter and a radar receiver are correspondingly used in the spectrum of radar waves or microwaves. The respective transmitter and receiver are preferably arranged in the scanning unit, that is they execute their movement about the axis of rotation and are supplied via the energy transmission unit from the base unit.

The guide elements are preferably arranged in annular form about the axis of rotation and are in particular arranged with respect to one another such that the L-shaped cross-sections together form a hollow ring. The hollow ring is produced in that the L shapes are point reflected or rotated by 180° with respect to one another and complement one another to form a rectangular cross-section. The rectangular cross-section is open at the transitions at the end of the limbs of the L shapes since the two guide elements move with respect to one another there.

The guide segments are preferably configured as ring segments that complement one another to form a ring about the axis of rotation. Each of the guide segments thus forms a sector of a circle or of a ring, preferably each of the same fraction of 360°. In this respect, the guide segments do not completely cover their fractions; certain gaps and tolerances remain between the ring segments in the peripheral direction. At least two, preferably three to six or eight ring segments are provided. A larger number is conceivable, but the number soon reaches its limit where additional benefits can no longer be reached.

The guide elements preferably have a ring-shaped carrier, in particular composed of plastic, on which the guide segments are aligned at abutment at the air gap and are thus fixed to the carrier. The carrier substantially facilitates the manufacture since a rough alignment is immediately provided and an exact alignment with respect to the air gap is substantially facilitated. In addition, the carrier provides mechanical stability for the guide elements and the robustness with respect to a single-part ferrite component is substantially improved thanks to the more flexible and non-brittle properties.

The carrier preferably has segment dividers between the guide segments. This facilitates both the initial rough alignment and the exact alignment at abutment at the air gap in the manufacture. In addition, the guide segments remain better fixed in their positions and the carrier becomes more robust. However, if the gaps between the guide segments should be kept as small as possible to guide the magnetic field even better and thus to further increase efficiency, the segment dividers can also be dispensed with.

The guide segments are preferably manufactured from ferrite. Ferrite has the properties required for the guidance of the magnetic field. With its brittleness and high shrinking tolerance, ferrite as the material also has disadvantages that are, however, largely overcome by the invention.

Coils are preferably placed into the guide elements. One fixed-position coil and one co-moved coil respectively provide the inductive energy transmission. The guide elements surround the coils and guide the magnetic field.

An air gap that is arranged in parallel with or perpendicular to the axis of rotation is provided between the coils. The air gap forms the transition between the stationary base unit and the movable scanning unit. Conventionally, as described in the introduction, completely different ring geometries would be required for a parallel air gap and a perpendicular air gap because the rings are disposed concentrically to one another, on the one hand, and on one another, on the other hand. With the guide elements in accordance with the invention having an L-shaped cross-section, the coils can selectively be arranged at the horizontally or vertically oriented limb. This does not, however, preclude the guide elements differing from one another in their detailed geometry for a parallel air gap and a perpendicular air gap, for example to always accommodate the coils on the long limb of the L shape.

The manufacturing method in accordance with the invention can be further developed in a similar manner and shows similar advantages in so doing. Such advantageous features are described in an exemplary, but not exclusive manner in the subordinate claims dependent on the independent claims.

In this respect, the guide segments are initially placed with a rough alignment into an annular carrier of a guide element, are then aligned at abutment with the air gap, and are finally fixed to the carrier in this alignment. A manufacturing method is specified in this manner that is simple to carry out, nevertheless has extremely low tolerances, and can be achieved with a very small air gap.

The guide elements are preferably aligned with respect to the air gap by abutment at a magnetic assembly ring. Due to the ferromagnetic properties of the guide segments, they move on their own into the position predefined by the magnetic assembly ring with a common abutment about the provided air gap. In this respect, with a perpendicular air gap, an inner assembly ring for the guide element having the outer coil and an outer assembly ring for the guide element having the inner coil are required.

Figure 2A:
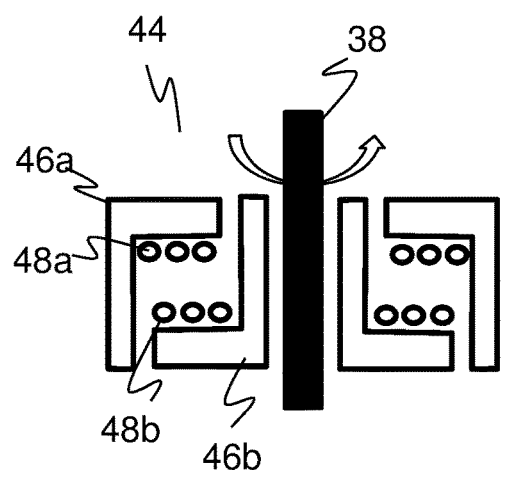
Figure 2B:
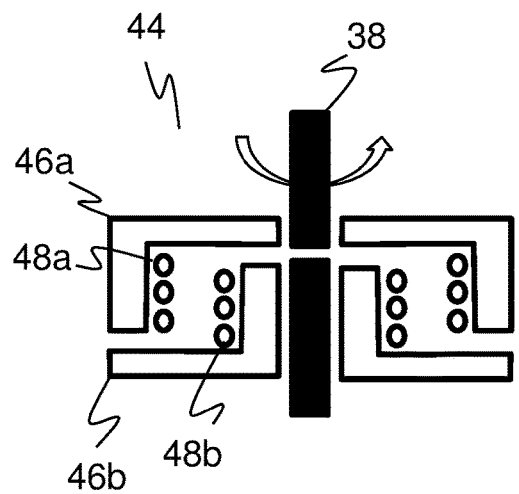
Figure 3A:
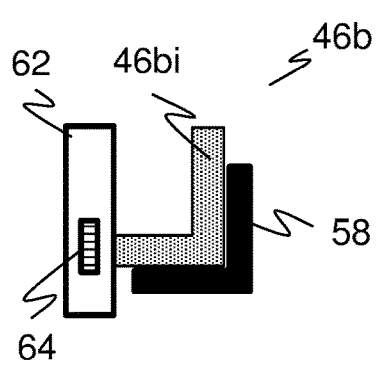
Figure 3B:
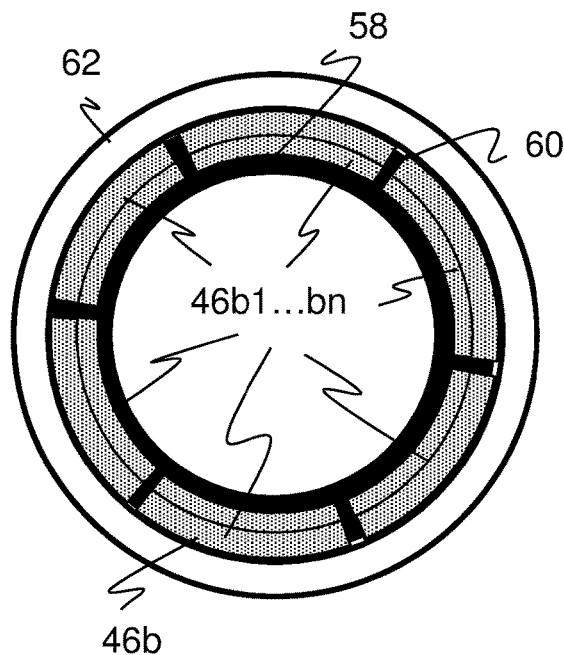

The invention will be explained in more detail in the following also with respect to further features and advantages by way of example with reference to embodiments and to the enclosed drawing. The Figures of the drawing show in:

FIG. 1 a schematic sectional representation through a laser scanner;

FIG. 2a a detailed view of an energy transmission unit with a perpendicular air gap;

FIG. 2b a detailed view in accordance with FIG. 2a, now with a parallel air gap;

FIG. 3a a sectional view of a guide element for the energy transmission unit with a guide segment on a carrier that is arranged in an assembly ring during manufacturer; and FIG. 3b a plan view of the guide element in accordance with FIG. 3a.

FIG. 1 shows a schematic sectional representation through a laser scanner 10. The laser scanner 10 in a rough distribution comprises a movable scanning unit 12 and a base unit 14. The scanning unit 12 is the optical measurement head, whereas further elements such as a supply, evaluation electronics, terminals, and the like are accommodated in the base unit 14. In operation, the scanning unit 12 is set into a rotational movement about an axis of rotation 18 with the aid of a drive 16 of the base unit 14 to thus periodically scan a monitored zone 20.

In the scanning unit 12, a light transmitter 22 generates a transmitted light beam 26 with the aid of a transmission optics 24, the transmitted light beam 26 being screened by a tube 28 and being transmitted into the monitored zone 20. If the transmitted light beam 26 is incident onto an object in the monitored zone 20, a corresponding light beam returns to the laser scanner 10 as remitted light 30. The remitted light 30 is guided by a reception optic 32 onto a light receiver 34 and is converted there into an electrical received signal. The light receiver 34 is arranged in this embodiment on a circuit board 36 that lies on the axis of rotation 18 and is connected to the shaft 38 of the drive 16. The reception optics 32 is supported by legs 40 on the circuit board 36 and holds a further circuit board 42 of the light transmitter unit 22. The two circuit boards 36, 42 are connected to one another and can also be designed as common flexible printed circuit boards.

This specific design of the scanning unit 12 is to be understood purely by way of example. The actual subject matter of the invention is a contactless inductive energy transmission unit 44 for transmitting energy from the base unit 14 into the scanning unit 12. The energy transmission unit 44 has a guide element co-moved with the scanning unit 12 and having a coil 48a and a guide element 46b, with a coil 48b, stationary with the base unit 14. The transition 50 between the scanning unit 12 and the base unit 14 extends, as indicated by a dashed line, between the guide elements 46a-b and coils 48a-b. The inductive energy transmission unit 44 will be explained more exactly below with reference to FIGS. 2a-b and 3a-b. The energy transmission can be supplemented by a wireless data transmission.

The energy transmission unit 44 is connected in the scanning unit 12 to the circuit board 36 and in the base unit 14 to a supply unit 52 that is, for example, connected to the mains supply via a connector 54. A control and evaluation unit 56 is furthermore arranged in the base unit 14 and is connected to the elements of the base element 14 to be controlled and also, via the already addressed wireless transmission, not shown, to the scanning unit 12, for example likewise to the circuit board 36. In this manner, the control and evaluation unit 56 can control the light transmitter 22 and receives the received signal of the light receiver 34 for a further evaluation. The control and evaluation unit 46 additionally controls the drive 16 and receives the signal of an angular measurement unit which is not shown, which is generally known from laser scanners, and which determines the respective angular position of the scanning unit 12.

The distance from a scanned object is measured for the evaluation, preferably using a time of flight process. The respective angular position at which the transmitted light beam 26 was respectively transmitted is likewise known from the angular measurement unit. Two-dimensional polar coordinates of all the object points in a scanning plane are thus available after very scan period via the angle and distance. A three-dimensional monitored zone 20 can also be detected by an additional tilting of the scanning unit 12.

As already mentioned with respect to the specific design of the scanning unit 12, the design of the laser scanner 10 is also to be understood as exemplary overall. Alternatively to the system shown having only one scanning beam 26, 30, a multi-beam system is also conceivable that carries out a plurality of scans spaced apart in elevation. A laser scanner 10 per se is also an example for an optoelectronic sensor having a scanning unit 12 movable about the axis of rotation 18 and having a stationary base unit 14 in which the energy transmission unit 44 can be used. The invention is also not restricted to optoelectronic sensors, but can rather also be configured as a radar, for example. The rough design is not changed thereby. Corresponding radar transmitters and radar receivers take the place of the light transmitter 22 and the light receiver 34 and the optics are omitted or are replaced with a radome or the like.

FIG. 2a shows a detailed view of the inductive energy transmission unit 44 with a perpendicular air gap; FIG. 2b a corresponding detailed view with a parallel air gap. As also already in FIG. 1, a section through the energy transmission unit 44 of ring shape overall is shown. The guide elements 46a-b, preferably produced from ferrite, are accordingly each rings. They have an L-shaped cross-section. The two L shapes have point symmetry with respect to one another or are rotated by 180° and so effectively form a rectangular hollow space. Coils 48a-b are there co-moved with respect to one another or are arranged as stationary.

The magnetic field is guided almost equally well by these L shapes as with conventional ring shells with the same air gap. The introduction of in particular the outer coil 48a is, however, very simplified. The coils 48a-b can be completely wound from above or below for both guide elements directly or with the aid of a coil carrier. The coils 48a-b can also be wound from enameled copper wire or Litz wire or can be implemented within a circuit board, with or without an additional carrier. The number of windings, the winding layers, and the winding type are adapted to the respective specific demand. As can be directly recognized from FIGS. 2a-b, there is only a slight construction difference between the embodiments with perpendicular and parallel air gaps due to the L shapes and their arrangement. That variant can be selected in which influences such as the bearing clearance of the drive 16 or vibration loads and shock loads have as little effect as possible on the width of the air gap.

FIGS. 3a and 3b show a sectional view or plan view respectively of a guide element 46b, with the inner guide element 46b of the base unit 14 being singled out as representative here. The guide elements 46a-b are each divided into a plurality of guide segments 46a1-bn that individually form circle sectors or ring sectors and that only form a ring together. Instead of six guide segments 46a1-bn as shown, more or fewer can also be provided.

The efficiency losses of the inductive coupling due to the segmentation are small as long as the gaps between the guide segments 46a1-bn remain small. Unlike a conventional ferrite produced from one piece, only reduced absolute tolerances occur per guide segment 46a1-bn since the expected shrinkage between the ferrite blank and the sintered ferrite is smaller with the comparatively small guide segment 46a1-bn than with a total ring. In addition, small ferrites can be manufactured disproportionately more favorably than large ones due to volume effects.

FIGS. 3a-b also illustrate an additional production step by which the guide segments 46a1-bn are correctly aligned and joined together. The guide segments 46a1-bn are first placed into a carrier 58 and are thereby already roughly aligned. The carrier 58 preferably has segment dividers 60. Different production processes such as plastic injection molding can be considered for the carrier that unlike the machining of ferrites are very inexpensive and exact.

The guide segments 46a1-bn are then aligned with high precision toward the desired air gap by an abutment. The abutment is here predefined by an assembly ring 62 that is removed again after manufacture. The assembly ring 62 has magnets 64 at the desired abutment position. The alignment then takes place independently thanks to the magnetic properties of the guide segments 46a1-bn. Subsequent to the alignment, the guide segments 46a1-bn are fixed together with the carrier 58. The coil 48a-b can be added simultaneously or subsequently. FIG. 3a-b illustrates the introduction element 46a of the base unit 14. An inner assembly ring is correspondingly used for the other guide element 46b of the scanning unit 12 instead of the outer assembly ring 62.

The guide elements 46a-b thus produced are highly precisely aligned with respect to the respective air gap and this precision is further increased by the relatively small absolute tolerances of the guide segments 46a1-bn. The mechanical tolerances in the whole tolerance chain together with the alignment are so small that a reworking is no longer necessary. This produces huge savings that exceed the costs of the additional production step by a multiple. In addition, the energy transmission unit 44 becomes very much more elastic due to the joining and the additional fixing of the individual guide segments 46a1-bn on the carrier 58 and breakages of brittle ferrite material on mechanical or thermal loads then become less probable.

The invention claimed is:

1. A sensor for detecting objects in a monitored zone, the sensor comprising:
    at least one transmitter for transmitting a transmission signal;
    at least one receiver for generating a received signal from the transmitted signal reflected back by the objects;
    a base unit;
    a scanning unit movable about an axis of rotation with respect to the base unit for a periodic scanning of the monitored zone;
    a control and evaluation unit for detecting information on the objects with reference to the received signal; and
    an inductive energy transmission unit provided between the base unit and the scanning unit that comprises a first guide element of the base unit and a second guide element of the scanning unit for guiding the magnetic field of the inductive energy transmission;
    wherein the guide elements have an L-shaped cross-section; and
    wherein the guide elements are divided into at least two respective guide segments in the peripheral direction.
2. The sensor in accordance with claim 1,
    wherein the sensor is one of a laser scanner and a radar.
3. The sensor in accordance with claim 1,
    wherein the guide elements are arranged in ring shape about the axis of rotation.
4. The sensor in accordance with claim 1,
    wherein the guide elements are arranged in ring shape about the axis of rotation and are arranged with respect to one another such that the L-shaped cross-sections together form a hollow ring.
5. The sensor in accordance with claim 1,
    wherein the guide segments are configured as ring segments that complement one another to form a ring about the axis of rotation.
6. The sensor in accordance with claim 1,
    wherein the guide elements have a ring-shaped carrier on which the guide segments are aligned at abutment with the air gap and are thus fixed to the carrier.
7. The sensor in accordance with claim 6,
    wherein the ring-shaped carrier is composed of plastic.
8. The sensor in accordance with claim 6,
    wherein the carrier has segment dividers between the guide segments.
9. The sensor in accordance with claim 1,
    wherein the guide segments are manufactured from ferrite.
10. The sensor in accordance with claim 1,
    wherein coils are placed into the guide elements.
11. The sensor in accordance with claim 10,
    wherein an air gap is provided between the coils and is arranged in parallel with or perpendicular to the axis of rotation.
12. A method of manufacturing an inductive energy transmission unit for a sensor having a base unit and a scanning unit having a base unit and a scanning unit movable about an axis of rotation with respect to the base unit, wherein the energy transmission unit comprises a first guide element for the base unit and a second guide element for the scanning unit for guiding the magnetic field of the inductive energy transmission;
    wherein the guide elements have an L-shaped cross-section; and wherein the guide elements are composed of at least two respective guide segments complementing one another in a peripheral direction.
13. The method in accordance with claim 12,
    wherein the sensor further comprises at least one transmitter for transmitting a transmission signal, at least one receiver for generating a received signal from the transmitted signal reflected back by the objects, and a control and evaluation unit for detecting information on the objects with reference to the received signal, and wherein the inductive energy transmission unit is provided between the base unit and the scanning unit.
14. The method in accordance with claim 12,
    wherein the guide segments are initially placed with a rough alignment into a ring-shaped carrier of a guide element, are then aligned at abutment with the air gap, and are finally fixed to the carrier in this alignment.
15. The method in accordance with claim 14,
    wherein guide elements are aligned with respect to the air gap by abutment at a magnetic assembly ring.

* * * * *